April 9, 1935.  R. CHELTON  1,997,357
AUTOMOBILE STOP
Filed May 28, 1932  2 Sheets-Sheet 1
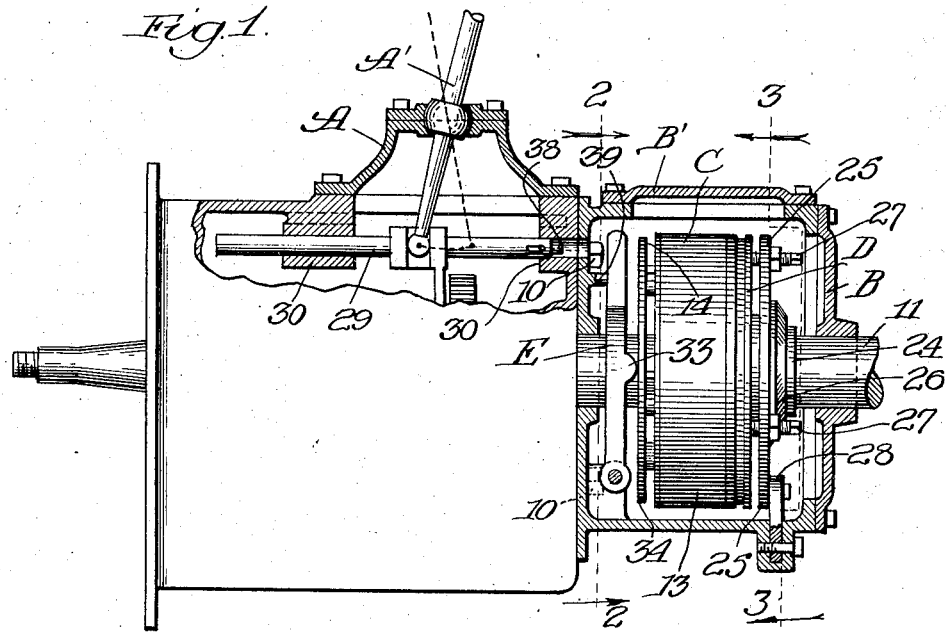
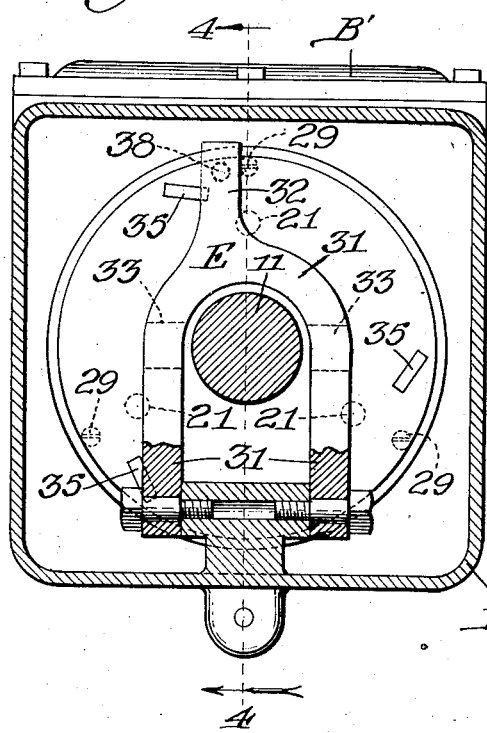
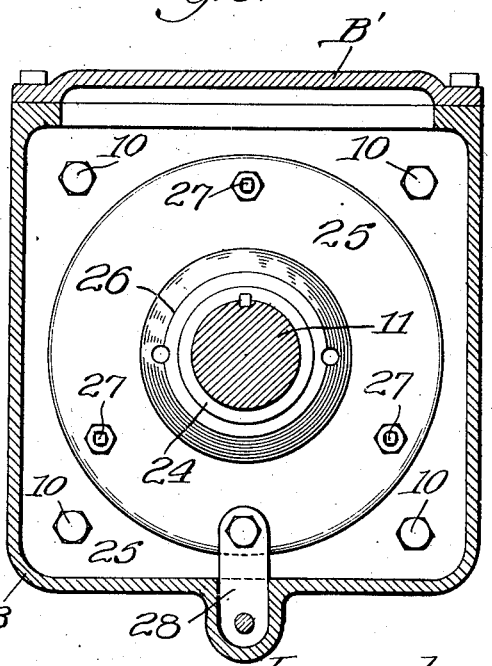
Inventor.
Robert Chelton,
By Dynforth, Lee, Chritton & Wiles,
Attys.

April 9, 1935.  R. CHELTON  1,997,357
AUTOMOBILE STOP
Filed May 28, 1932  2 Sheets-Sheet 2
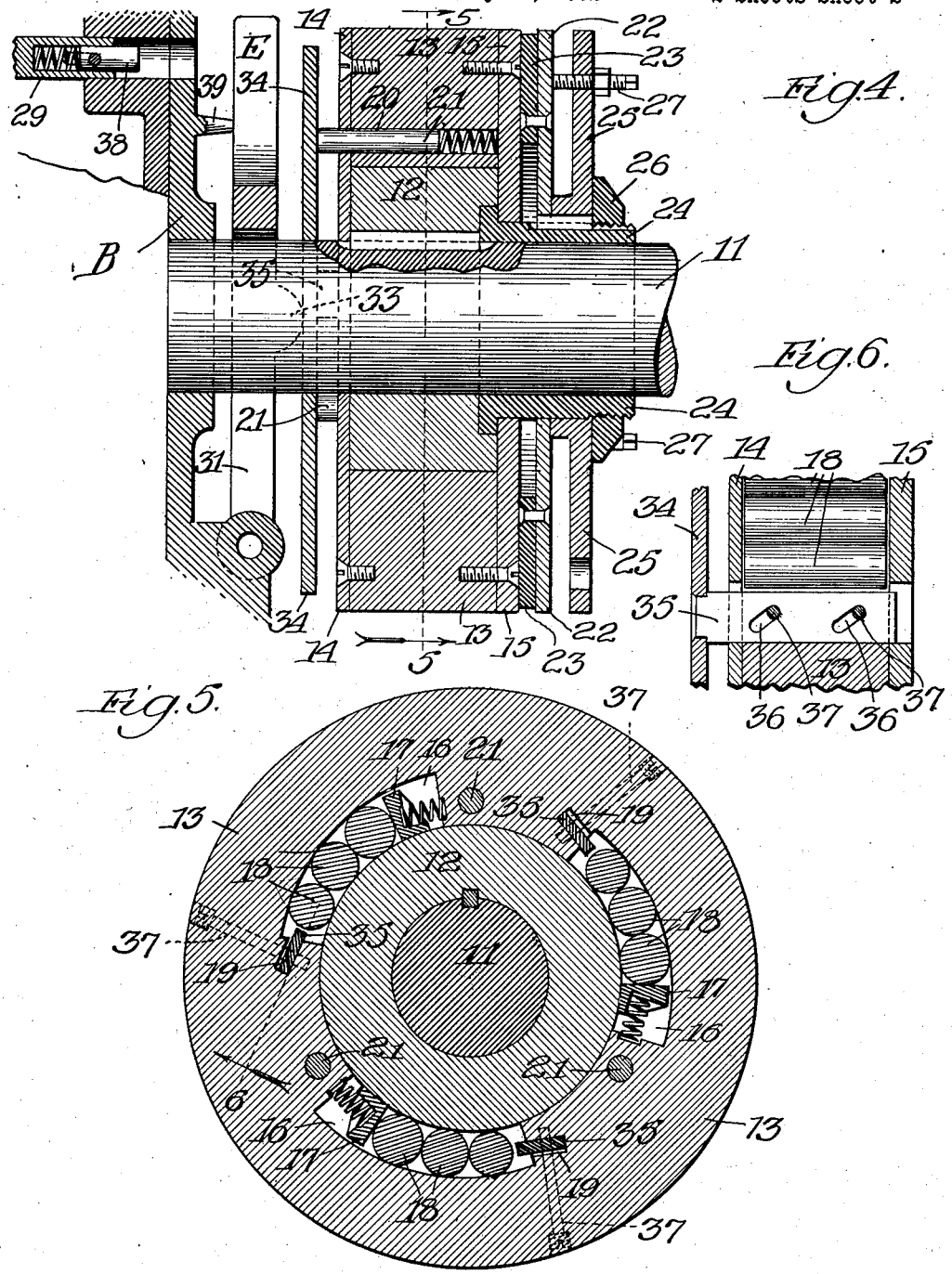
Inventor:
Robert Chelton, Patented Apr. 9, 1935

1,997,357

UNITED STATES PATENT OFFICE 1,997,357

AUTOMOBILE STOP

Robert Chelton, Chicago, Ill.

Application May 28, 1932, Serial No. 614,251

3 Claims. (Cl. 192—4)

This invention relates to an automobile stop and more particularly to mechanism associated with the propeller shaft of an automobile for preventing rearward movement of the car when on an incline except when the gear shift lever is moved to reverse position.

Heretofore it has been proposed to use gear and pawl mechanism on the rear wheels of vehicles to prevent the vehicles from moving backward when on an incline and also positive means have been provided for releasing the pawl to permit backing of the vehicle. Such apparatus is of course too heavy, noisy and too far removed from the controls to be practical for use on the modern automobile. It has also been proposed to use similar mechanism in connection with the propeller shaft of an automobile and at a point adjacent the transmission box. Such device or devices have, however, been found impracticable because of the noise and because the mechanism has not served to stop the car when the gear shift is in neutral position. In view of the fact that when an automobile stops on an incline, it is usually necessary to shift the gear lever from third or second through the neutral position to first, it is highly important that the stop mechanism serve to check rearward movement of the car when the gear shift is in neutral position. It is quite common to hold the gear shift in neutral position when a car has been stopped by traffic lights on a hill and when an appreciable wait is necessary before the car can proceed.

Applicant's invention has for its object the provision of a relatively silent stopping or checking mechanism which will prevent rearward movement of the car when the gear shift is in neutral position and, in fact, in all positions except the reverse position. Other objects and advantages will appear as the specification proceeds.

The invention is illustrated, in its preferred embodiment, in the accompanying drawings, in which:

Figure 1 is a side view in elevation, of apparatus embodying my invention, a portion of the casing being broken away; Fig. 2, an enlarged view taken along line 2—2 of Fig. 1; Fig. 3, an enlarged view taken along line 3—3 of Fig. 1; Fig. 4, a longitudinal sectional view, the section being taken as indicated at line 4—4 of Fig. 2; Fig. 5, a transverse sectional view, the section being taken as indicated at line 5—5 of Fig. 4; and Fig. 6, a broken detail sectional view, the section being taken as indicated at line 6—6 of Fig. 5.

In the illustration given, A designates a transmission box of the usual type equipped with a gear shift lever A'; B, a casing for the stop mechanism; C, stop mechanism associated with the propeller shaft of the car; D, braking mechanism frictionally engaging the stop mechanism C; and E represents release means adapted to release the stop mechanism when it is desired to drive the car in reverse.

The transmission box A may be of the usual type and may house transmission gears of well known construction.

The casing B is designed to completely house the stop mechanism C, the braking mechanism D and the release mechanism E. It may be secured directly to the transmission box A by bolts 10 or other suitable means. The casing B is preferably equipped with a removable cover B' through which access may be had to the mechanism and through which lubricant may be supplied to the interior of the box. The casing is apertured at opposite ends to permit the propeller shaft 11 to extend therethrough.

The stop mechanism C, in the illustration given, comprises a rotatable collar 12 which is keyed to shaft 11 and an outer cylinder or retarding ring 13. The collar 12 and ring 13 are held in alignment by disks 14 and 15 both of which are fixedly secured to the outer ring 13. As shown more clearly in Fig. 5, the cylinder 13 is provided on its inner side with three slotways 16, each of which is equipped at one end with a spring-pressed bar 17. The slotways are deeper toward the end occupied by the bar 17 than toward the opposite end and the space between the top wall of the slotway and the outer surface of the collar 12 is occupied by roller bearings 18 which are of varying diameters. The roller nearest the member 17 has the greatest diameter. Communicating with the smaller ends of the slotways 16 are guide slots 19 for a purpose which will be hereinafter described. Collar 12 is keyed directly to the drive shaft 11; it is connected to the cylindrical ring 13 only by means of the rollers 18 which permit the collar to turn freely when the shaft 11 is turning in a clockwise direction, but lock the collar 12 to the member 13 when the shaft turns in the opposite direction.

The cylinder 13 and plate 14 are provided with three recesses 20 in which are mounted spring-pressed plungers 21 for a purpose hereinafter to be described. The brake mechanism D may be of any suitable form to apply frictional pressure to the cylinder 13 or disk 15. In the illustration given, a disk 22 is provided with a circular shoe 23 which frictionally engages the disk 15. The disk 22 encircles and is keyed to a sleeve member 24 which extends about the drive shaft 11. A fixed disk 25 also encircles and is keyed to sleeve 24. A nut 26 may be employed to secure the disks 25 and 22 in position. The disk 25 is preferably provided with threaded openings receiving adjustment screws 27 which bear against the outer portion of disk 22 and hold the bearing member 23 against the disk 15. Any means may be employed to fix the disk 25 to a stationary part of the chassis or frame. In the illustration given, a metal strap 28 is secured to the plate 25 and to the casing B.

The release mechanism E may be of any suitable construction designed to release the cylinder 13 from the hub 12 when the gear shift lever is placed in reverse position. In the illustration given, a sliding rod 29 is guided in perforated lugs 30 which form a part of casing A. The rear end portion of the rod 29 is sufficiently long to strike the pivoted member 31 when the gear shift lever A' is moved to reverse position. As shown more clearly in Figs. 1, 2 and 4, the member 31 is shaped like an inverted Y and is pivotally secured to casing B' at its lower ends. The upper end 32 of the swinging member 31 lies in the path of the reciprocable rod 29 so as to be actuated thereby. On its rear side, the member 31 is provided with rounded extensions 33 which engage a disk 34 rotatably mounted upon drive shaft 11. Disk 34 is normally held against the extensions 33 by the spring-urged plungers 21. Riveted to the plate 34 are three slides 35 which extend through the slotways 19 and partially into the large slots 16. As will be seen more clearly in Figs. 5 and 6, the slides are provided with inclined guide slots 36 which are engaged by pins 37. The fixed pins 37, as shown more clearly in Fig. 5, extend from the outer surface of the cylinder 13 and through the inclined guide openings 36. As the slides 35 are moved inwardly, the pins engage the guide slots and cause the slides to move into the slots 16 and engage the rollers 18. The slides being fixed to the rotatable disk 34, it is necessary for the disk to rotate slightly as the slides move into the slotway 16. In order to permit the slight lateral play that is necessary in this movement, the guide slots 19 are made wider than the slides 35.

In order to prevent injury to the parts, I prefer to equip the rear hollow end of sliding rod 29 with a spring-pressed plunger 38. A stop 39 may be formed integrally with the casing B to engage the swinging member 31 and maintain it in substantial vertical position against the pressure exerted by the spring-pressed plungers 21.

In the operation of the apparatus, the drive shaft will turn, say, in a clockwise direction when the car is going in a forward direction. The collar or hub 12, which is keyed to shaft 11, will tend to force the rollers 18 toward the enlarged end of the slot 16 and in this position, the rollers will not lock the members 12 and 13 together. When, however, the member 12 is rotated in the opposite direction, as when the car is moving rearwardly, the member 12 and member 17 will force the rollers 18 toward the narrow end of the slot 16 and will cause them to bind between the ring 13 and hub 12, thus connecting the two members as one member. The member 17 normally urges the rollers 18 toward the narrow end of the chamber so as to bring about a quick locking action. The ring 13, being frictionally held by reason of the contact of disk 15 with the fixed friction ring 23, will retard the movement of the hub 12 and thereby the drive shaft of the car. In other words, the rearward movement of the car will be checked and then stopped. The friction means allows slight rotation of the member 13 and thus diminishes the strain that is placed upon these parts when the car is stopped. With this construction, the rearward movement of the car is prevented no matter in what position the gear shift lever is. The release mechanism E frees the member 13 from locking engagement with hub 12 when the gear shift lever is pushed to reverse position. The rod 29 strikes the swinging member 31 which in turn moves the disk 34 rearwardly. As the disk 34 moves to the rear, the slides 35 are guided by pins 37 and guide slots 36 into the large slots 16 where they engage the rollers 18 and force them toward the enlarged end of the roller chambers. The hub 12 is then free to rotate in a counter-clockwise direction and the car may be moved in reverse.

The casing B is adapted to receive lubricant which will tend to make the parts operate almost noiselessly. The removable cover B' permits lubricant to be introduced and also offers access to the working parts for repair purposes.

The mechanism is simple, compact and may be installed upon cars already in use.

The foregoing detailed description has been given for clearness of understanding only, and no unnecessary limitations should be understood therefrom, but the appended claims should be construed as broadly as permissible, in view of the prior art.

I claim:

1. In combination with an automobile equipped with a drive shaft and with a gear shift lever, a hub fixed to said shaft, an outer ring affording a chamber between it and the outer surface of said hub, said chamber having an inclined wall so as to provide an enlarged end and a narrow end, rollers in said chamber, said rollers permitting rotation of the hub in one direction but binding against the narrow end of said chamber to lock said hub and ring when the hub is moved in the opposite direction, fixed friction means engaging said ring, slidable means adapted to be reciprocated in said ring to move said rollers toward the enlarged end of said chamber, and means associated with said gear shift lever for reciprocating said slidable means.

2. In combination with an automobile equipped with a drive shaft and with a gear shift lever, stop mechanism comprising an inner hub fixed to said shaft, an outer cylinder providing between it and said hub a chamber having an inclined wall so as to provide an enlarged end and a narrow end, fixed friction means engaging said cylinder, a roller in said chamber, and means actuated by said gear shift lever for moving said roller toward the enlarged end of said chamber.

3. In combination with an automobile equipped with a drive shaft and a gear shift lever, a hub fixed to said shaft, an outer cylinder affording a chamber between it and said hub, said chamber having an inclined wall so as to provide an enlarged end and a narrow end, yieldable means for retarding rotation of said cylinder, a roller in said chamber, said roller permitting rotation of the hub in one direction but binding against the narrow end of said chamber to lock said hub and cylinder when the hub is moved in the opposite direction, and means actuated by said gear shift lever for moving said roller toward the enlarged end of said chamber.

ROBERT CHELTON.